United States Patent [19]
Lee

[11] 3,766,037
[45] Oct. 16, 1973

[54] ELECTROCHEMICAL PROCESSES FOR THE REMOVAL OF CONTAMINANTS FROM AQUEOUS MEDIA
[75] Inventor: Sung Ki Lee, Niagara Falls, N.Y.
[73] Assignee: Andco Incorporated, Cheektawaga, N.Y.
[22] Filed: Feb. 11, 1972
[21] Appl. No.: 225,417

[52] U.S. Cl. .................................. 204/152, 204/149
[51] Int. Cl. ............................ C02c 5/12, C02b 1/82
[58] Field of Search ..................... 204/149, 152, 114

[56] References Cited
UNITED STATES PATENTS
744,171   11/1903   Davis & Perrett .................. 204/152
766,146    7/1904   Jewell & McGee ................. 204/149
3,706,646  12/1972  Gibson, Jr. et al. ................. 204/149

*Primary Examiner*—John H. Mack
*Assistant Examiner*—A. C. Prescott
*Attorney*—Conrad Christel and Edwin T. Bean, Jr.

[57] ABSTRACT

Contaminating anions are removed from aqueous media by reacting them indirectly with lead from an anode to produce an insoluble lead compound which is subsequently separated from the aqueous medium. The lead is obtained from an anode containing lead or an insoluble lead compound which reacts with an activating ion, such as acetate or chloride, to produce soluble lead ions, which subsequently react with the contaminant anion, e.g., chromate from a purge stream of cooling tower water or from rinses of chrome plated articles. Also described are electrolytic cells and apparatuses useful in the practice of the method.

17 Claims, 5 Drawing Figures

Patented Oct. 16, 1973
3,766,037
3 Sheets-Sheet 2
Fig.2.
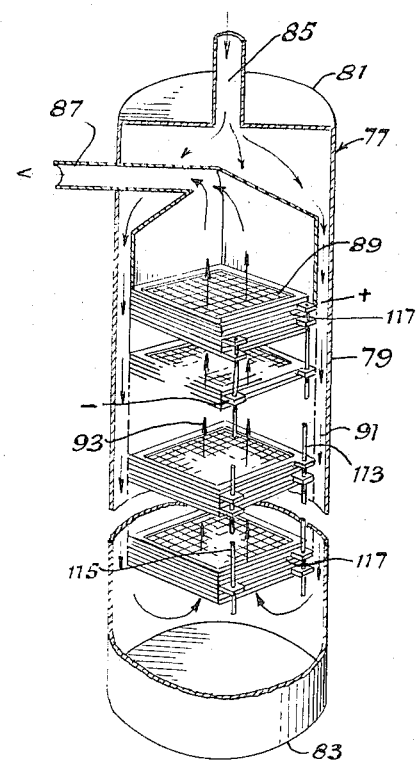
Fig.3.
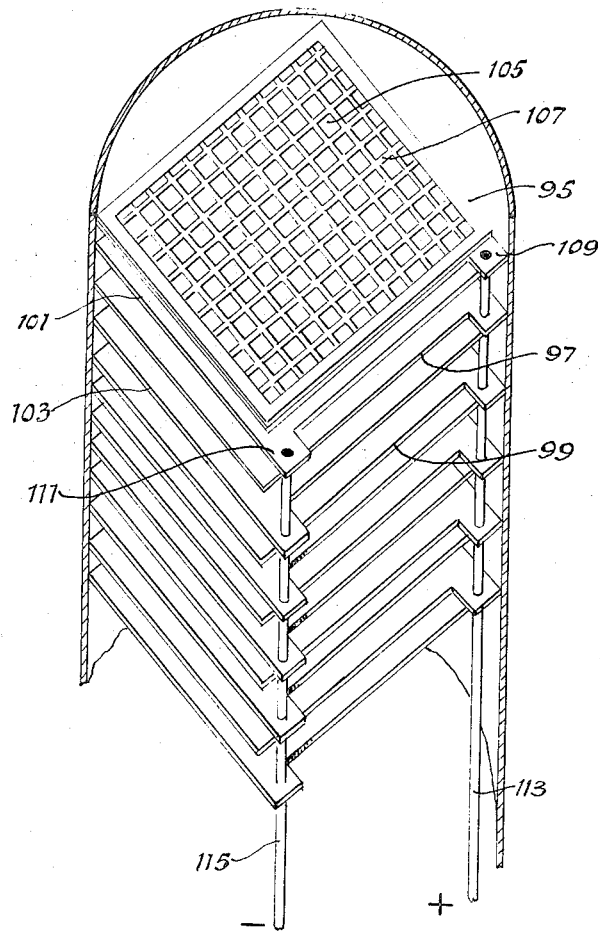
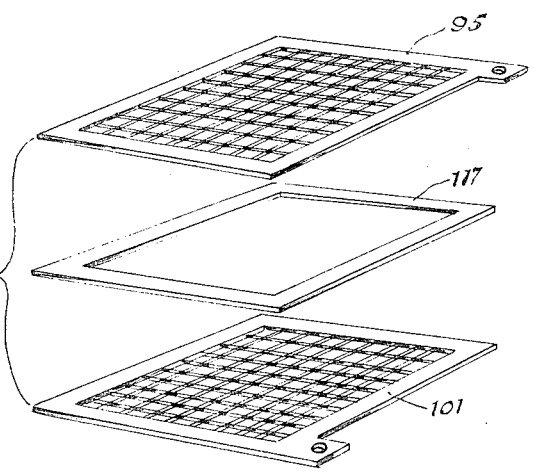
Fig.4

ELECTROCHEMICAL PROCESSES FOR THE REMOVAL OF CONTAMINANTS FROM AQUEOUS MEDIA

This invention relates to methods and apparatuses for the treatment of liquids to remove anionic contaminants or pollutants from them, including metals in the forms of anionic radicals. More particularly, the invention is directed to the treatment of spent process solutions, waste streams, rinse waters and effluents or purge streams from cooling towers and the wet scrubbing of contaminated gases, and the like. The invention also relates to electrolytic cells which are useful for effecting such treatments.

Most chemical contaminants which are to be removed from materials charged to a chemical process, chemical processing streams and wastes from such processes are treated by chemical means, such as by oxidizing agents, reducing agents or precipitating compounds so as to convert them to innocuous or comparatively innocuous forms or to permit their separation from the balance of the medium treated. Electrolytic means have been employed for purifications but in most cases such methods included the production of flocculent precipitates of the hydroxides or derivatives of an electrode metal which physically entrapped or adsorbed impurities. Iron and aluminum electrodes have been utilized for this purpose. However, lead electrodes have not been successfully employed. Among the reasons for this is that lead often forms extremely insoluble compounds which tend to coat the electrodes and limit reactions thereon after an initial stage. Also, lead is a toxic contaminant itself and in many cases is to be avoided on this ground, especially today, when even dilute waste streams must meet rigid anti-pollution legal standards, having to be extremely low in toxic contaminants before they can even be sewered.

Among the most difficult purification problems are those relating to removing small quantities of metallic or anionic radical contaminants from dilute aqueous solutions, such as rinse waters from chrome plating operations and purge streams from cooling tower waters that contain hexavalent chromium, usually as the chromate or dichromate, which is used to control corrosion and prevent microbiological growths and slimes from developing in such waters. Other problem treatment areas involve separations of cyanides, cyanates, arsenates, pyroarsenates, antimonates, selenates and other related salts from dilute aqueous solutions.

Now, in accordance with the present invention, it has been discovered that excellent purifications of waters containing even very small quantities of contaminants can be obtained by treating them electrochemically by passing them through a cell or cells having an anode of lead, lead alloy or insoluble lead compound and producing the insoluble lead salt or other lead derivative of the contaminant, which may be removed from the solution. Surprisingly, the present process does not result in coating of the electrode with an insulating insoluble compound of lead nor does it produce an effluent having an unacceptable lead content.

In accordance with the present invention a method for the removal of a lead-precipitatable anionic contaminant from an ionizing medium in which it is present at a low concentration comprises passing an electric current between an anode having on a surface thereof lead, lead alloy or an insoluble lead compound, and a cathode, through the ionizing medium containing the anionic contaminant and an activating ion for the lead, lead alloy or insoluble lead compound of the anode, which activating ion is capable of forming a lead salt which is soluble in the aqueous medium, to produce an insoluble lead salt or complex of the anionic contaminant, and removing the insoluble lead salt or complex from the aqueous medium. A useful electrolytic cell for practicing such method comprises a plurality of stacked electrodes having perforations in them through which electrolyte is flowed in a path substantially perpendicular to the axis of the stack, such cell structure helping to maintain the insoluble lead compound product in suspension until it is removed from the cell.

It will be evident from the above discussion and the following description that the present invention is applicable to the treatment of liquids resulting from operations in the metal finishing industries, paper mill effluents, brackish waters, sanitary and municipal sewage and the like, and provides a practical system for the recovery and use of the water in such solutions, as well as for recovery of valuable metals and other constituents of the solutions, and safe disposals of effluents.

An important aspect of the invention is the provision of essentially insoluble or poorly soluble metals or metallic compounds for the electrodes, surfaces of the electrodes or portions of the surfaces thereof. Ordinarily, when a metal anode is one which forms poorly soluble compounds with anions of the electrolyte the metal of the electrode will be consumed hardly at all and little electrolysis will be effected because the first cations that enter the solution as a result of anodic reaction will form an adherent coating on the anode, which passivates the anode material. Following the procedure of the present invention however, the electrolysis is performed in such a manner that the poorly soluble compound produced from the anode and the contaminant cation will not precipitate immediately on the anode surface but will do so at a distance from it, thus preventing it from sticking to the anode and allowing the anodic reaction to proceed, at a high current efficiency. The precipitation of the insoluble salt or complex at a distance from the anode also facilitates maintenance of the precipitate in suspension in the electrolytic cell employed and helps to prevent settling out or deposition of the precipitate on internal cell elements. The process is essentially unaffected by the presence of various contaminants in the processing stream and in fact, often such contaminants are also removed during the electrolysis. Thus, when chromate is being removed from waste liquid from metal treatment rinses, phosphate may also be precipitated and when plating baths or rinses of plated materials are being discharged, cyanide or similar ions present may be oxidized to less harmful forms. By regulation of the voltage, pH, presence of catalytic ions, flow rate, type of "activating" chemical employed, temperature and other parameters, the particular types of electrochemical purification reactions to be effected may be controlled.

Another significant advantage of the present invention is in the fact that the process may be carried out without need for a diaphragm or other separator between the anode and cathode portions of the electrolytic cell. Thus, the usually required periodic cleanings of the diaphragm and its replacement are avoided, as are the interferences of the diaphragm with solution flow, its acting as a collecting area for precipitate, and its diminution of the effective volume of solution reaction (by creating separate reactive anode and non-reactive cathode compartments). Also, any gas generated at the cathode serves to agitate the liquid and holds the insoluble compound produced in suspension, aiding in its removal, when the diaphragm is absent.

In most electrolytic reactions such a diaphragm or separator is necessary to prevent interactions of the products produced at the anode and the cathode or to prevent reversals of the reactions. However, in carrying out the present operations the chromate or other lead-insolubilizing anion reacts with the soluble lead ion and irreversibly or substantially irreversibly forms the insoluble lead chromate or other salt, which is not susceptible to further electrolytic reaction. In other words, the insoluble salt or complex produced by reaction with the lead ion is irreversible under the conditions of the reaction and therefore, the reaction continues until the undesirable anion is completely or substantially completely removed from the aqueous medium. The soluble lead ions do not deposit on the cathode, as might have been expected, because while being transported toward the cathode they have contacted the insolubilizing anion and have been irreversibly converted to insoluble form. Should any lead be plated out on the cathode, as when all insolubilizing impurities have been removed from the solution and lead ions are transported to it, it is a simple matter to reverse the direction of current flow and re-deposit the lead on the original anode, if so desired.

The various methods, apparatuses, operations, constructions, conditions, details, uses and advantages of the invention will be apparent from the following description, taken in conjunction with the illustrative drawing of preferred embodiments of the apparatuses used to practice the method of the invention and comparative results obtained, in which drawing:

FIG. 2 is a perspective view of an electrolytic cell for the removal of such contaminants from solutions, illustrating the liquid flow paths;

FIG. 3 is an enlarged and more detailed perspective view of the apparatus of FIG. 2;

FIG. 4 is a disassembled view of an anode-cathode pair of the cell of FIGS. 2 and 3, showing a spacer between them.

Figure 1:
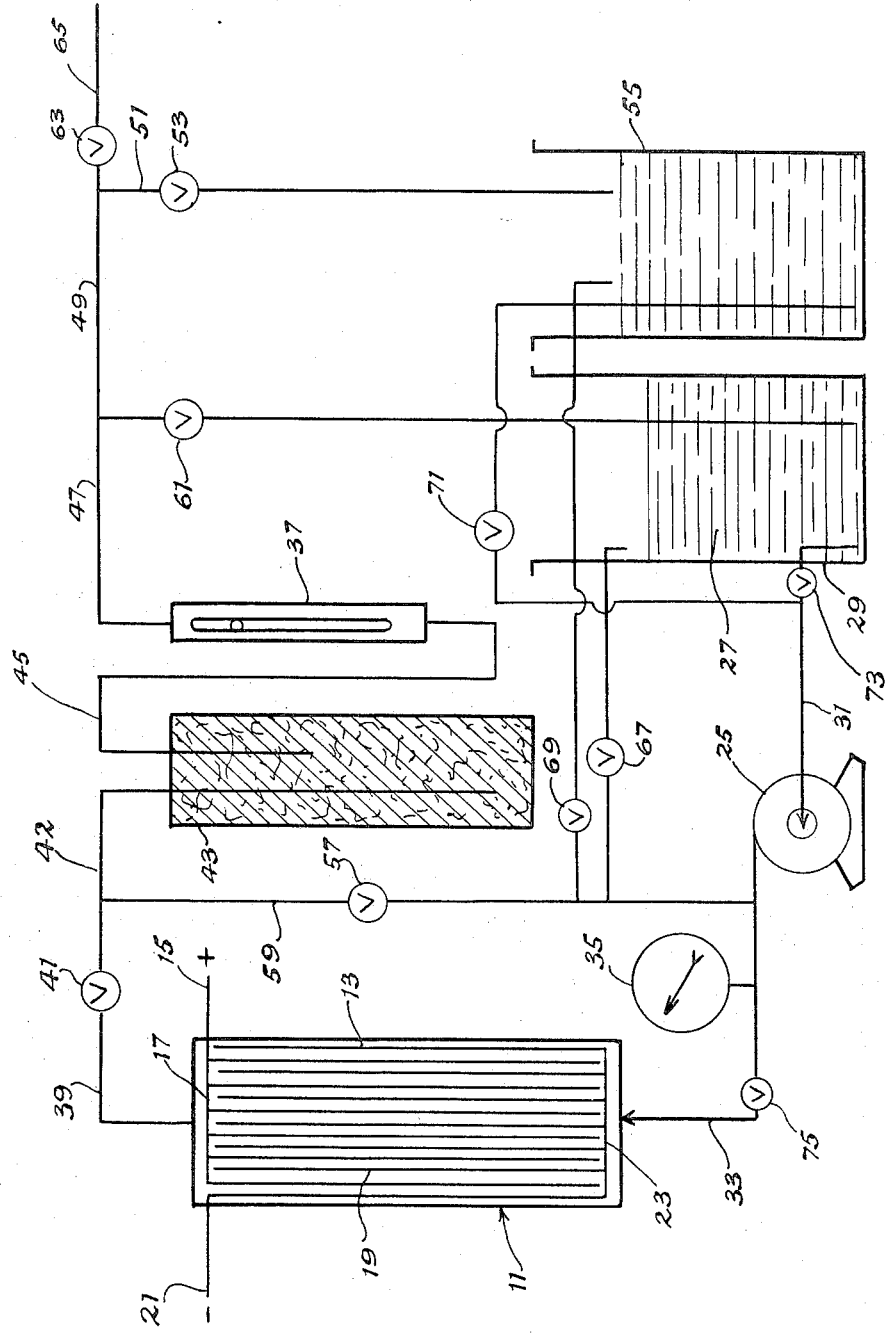
FIG. 1 is a schematic diagram of an apparatus for removing contaminants from liquids by the method of this invention.

In FIG. 1 electrolytic cell 11 includes anodes 13 connected to a source 15 of direct electric current through an anode bus 17, and cathodes 19, connected to a negative sink or "source" 21 through cathode bus 23. In the cell illustrated, the anodes and cathodes are monopolar and a plurality of them is shown. However, different numbers of anode-cathode combinations may be employed, both greater and less, and if desired, the electrodes may be bipolar. In the schematic representation of the electrolytic cell shown there are no diaphragms or spacers between the electrodes but, as will be seen from later illustrations of preferred embodiments of the electrolytic cell, spacers will normally be employed, while diaphragms are intentionally omitted.

Pump 25 draws an aqueous liquid, medium or solution 27 from tank or other source 29 through inlet line 31 and discharges it through line 33 to electrolytic cell 11. A pressure gauge 35 is employed in conjunction with flow meter 37 to measure the flow of the solution containing contaminant to be removed in the cell, so that the flow may be controlled by adjusting pump speed or bypass proportion or by partially opening or closing appropriate valves. The solution, now containing an insoluble lead salt or complex of the contaminant, e.g., lead chromate or lead dichromate, flows out of the cell through line 39 past valve 41, through line 42 and through filter 43, by which the insoluble contaminant salt or complex is removed from the flowing solution stream. Next, the clarified solution passes through line 45, flow meter 37 and lines 47, 49 and 51, past valve 53 and into storage tank 55 or other reservoir or, in some cases, a disposal line connecting to a sewer, recycle line or other stream.

The other piping and valves shown in FIG. 1 may be utilized for starting up and for modifying the process, when desired. Thus, valve 57, normally closed, may be opened to allow part of the already treated aqueous medium to flow back to electrolytic cell 11 by means of line 59. When valves 61, normally closed, and 53, normally opened, are both closed and valve 63 is opened instead of being closed, as may be normal, instead of the treated liquid being sent to tank 55, it may be sewered or otherwise disposed of through line 65. When valves 57, 71 and 75 are closed and valves 67 and 73 are open, solution from tank 29 may be circulated through the tank without otherwise passing through the electrolytic cell, filter, etc. Similarly, when valves 69 and 71 are open and valves 57, 67 and 75 are closed, material may be circulated in tank 55. By control of valves 71 and 29 liquid may be drawn from either tank 29 or 55 for treatment in the electrolytic cell. Of course, materials may be transferred from one tank to the other and different operations on various solutions may be undertaken by opening and closing the various valves in a manner that will now be obvious to one of skill in the art.

Although it is not specifically illustrated in FIG. 1, it is within the invention to cascade a plurality of electrolytic cells like that illustrated or its equivalent, so that a solution more dilute in contaminant may be sent through a second cell or may be returned to the first cell for further treatment, and, if desired, this cascading may be with respect to a plurality of cells, from two to five being the usual number. As pointed out earlier, an important characteristic of this invention is the controllability of the system. With nearly theoretical current density at about a neutral pH (6.5 to 7.5), there is no trace of soluble lead formed but under different conditions if soluble lead in the electrolyte being discharged from the cell is to be removed by chemical reaction with a lead-precipitating anion, a tank, not shown, may be provided intermediate cell 11 and valve 41 into which the precipitating chemical is added in such proportion to react completely with the lead and provide little or no excess precipitant. Both insoluble materials produced, that from the electrolytic production of insoluble lead compound and that from the chemical reaction with the soluble lead in the effluent electrolyte, may be filtered by filter 43. If desired, the precipitate in the effluent from the electrolytic cell may be filtered before a treatment with the chemical precipitant. A plurality of the electrolytic cells, filters, flow meters, tanks, lines and pumps may be provided so that in the event that any piece of equipment has to be taken out of service an alternate is available, and in some cases the "alternate" equipment may be used in series or in parallel with the "principal" piece of equipment.

In FIG. 2 there is illustrated a preferred embodiment of the electrolytic cell used for the present purification processes. Tubular container 77 comprises a wall portion 79, ends 81 and 83, inlet 85 and outlet 87. Such a container may be of plastic-lined metal, glass or stainless steel or other suitable material of construction. Inside the container is located a bank of electrodes 89, alternating anodes and cathodes with non-conductive spacers between them, the spacers sealing off the spaces between the electrodes at the peripheries thereof but not preventing passages of liquid axially through the stacked electrodes. As is seen from FIG. 2, the inlet and outlet from the cell are located at the same end thereof but in some cases it may be desirable to have a single-pass flow as illustrated in FIG. 1. The arrows indicate the direction of flow, the arrow designated 91 representing a flow vertically downward about the outside of the stack of electrodes and arrow 93 representing the upward flow of aqueous medium being decontaminated. Of course, instead of vertical disposition such as that indicated, the present cells may be located at an angle or horizontally, if so desired, but vertical positioning is preferred. Also, the container shape may be modified for particular applications. An advantage of the apparatus of FIG. 2 is that the solution entering serves to remove any excess heat from the exiting electrolyte and is raised in temperature before passing through the electrolytic part of the cell, which is sometimes desirable. However, heat removal is usually not a difficult problem. Another advantage is that the cell cannot go dry, exposing the electordes and promoting hardening thereon of any precipitate. If there is any leadkage of electrolyte into or out of the active cell volume it is only minor and no harm is done. Furthermore, some electrolysis occurs at the ends of the electrodes in the volume external to the cell and thereby increases the cell capacity.

The electrode stack portion of the cell of FIG. 2 is illustrated in more detail in FIG. 3, together with a portion of the surrounding container. Anodes 95, 97 and 99 and the other anodes, and cathodes 101 and 103 and the other cathodes, as illustrated, are of grid or waffle shape, with perforations or openings 105 between transversely positioned strips 107. In the particular apparatus shown, the strips are of lead, hardened with a total of about 3% of antimony, arsenic and oxides, for both the anodes and cathodes, and are of one piece, but such strips may be interwoven or otherwise made so as to furnish electrolytically active sites with passageways or openings between them. The antimony and arsenic form insoluble precipitates and are non-interfering. If they are objectionable, pure lead or lead-lead oxide electrodes can be substituted. The stacked electrodes may be aligned so that the passageways go directly through the stack or the openings may be staggered somewhat or inclined, generally with the angle of the passageway being no less than 30° from the horizontal, considering the illustrated stack as having a vertical axis. Ears 109 and 111 are provided to connect the anodes and cathodes to the positive and negative buses or conductors 113 and 115, respectively. The spacers between the electrodes are not illustrated well in FIG. 3 and are shown in more detail in FIG. 4. They do not block any of the openings 105 but do contact both anodes and cathodes so as essentially to seal off the active electrolytic portions thereof from the surrounding volume of the container.

The cell illustrated in FIG. 3 operates in the manner shown in FIG. 2, with the aqueous medium being electrolytically decontaminated while passing upwardly through the bank of electrodes so that the insoluble lead compound from the contaminant cation is produced as the electrolyte flows upwardly, repeatedly being in an electrolytically active area adjacent to both anodes and cathodes. The electrolyte is in motion and holds the insoluble lead compound made in suspension until it has been removed from the cell. Yet, strangely enough, the electrodes are not passivated by the insoluble lead compound and little thereof settles on them.

In FIG. 4 a single pair of electrodes, anode and cathode, is illustrated, with an elastomeric spacer, e.g., neoprene, nitrile rubber, other polymeric plastic spacer, e.g., PVC, PVDC, polypropylene, or other insulator, e.g., insulating asbestos, between them. The spacer is non-conductive and acts to seal off the electrolytic volume, to insulate the electrodes from contact with each other and to maintain the correct clearances between them for most effective operation of the cell. As shown, both the anode and cathode are of matching grid structures and both are of hardened lead, although in some embodiments of the invention it may be preferred to employ lead dioxide anodes and iron or steel cathodes.

Figure 5:
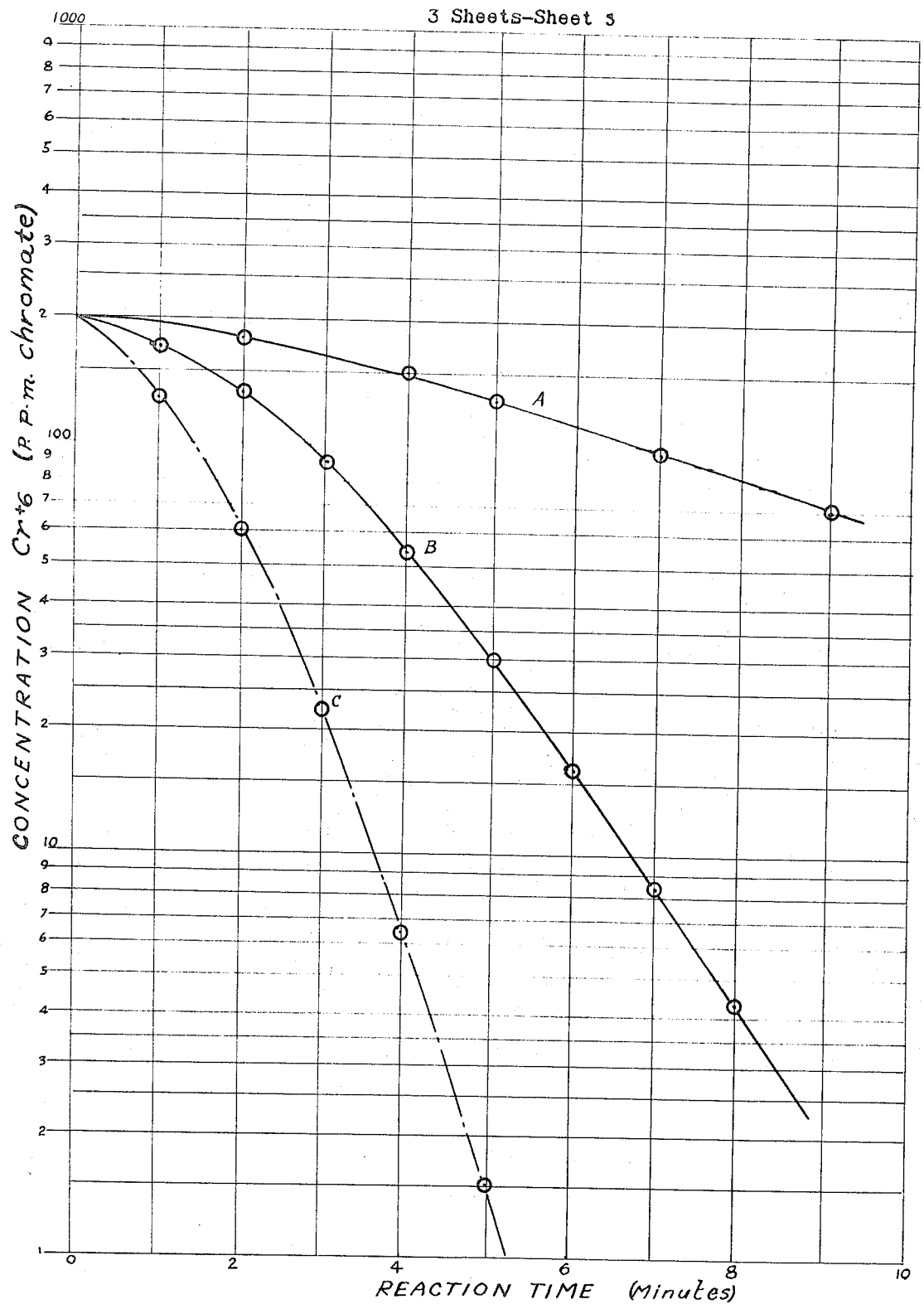
FIG. 5 is a semi-logarithmic graph illustrating improved contaminant removals by methods of the present invention, compared to an accepted prior art method.

In fIG. 5 there is plotted the reaction time (minutes) of a typical contaminant solution in an electrolytic cell of the type shown in FIGS. 2 and 3 vs. the concentration of the contaminant anion. The three curves, A, B and C, represent treatments of the same contaminated solution, initially containing 200 parts per million of hexavalent chromium, as $CrO_4^=$. As seen, after 9 minutes, utilizing a conventional sulfur dioxide treatment designed to convert hexavalent-chromium to trivalent-form and remove it, curve A indicates that there are still about 70 parts per million left. On the other hand, after only 3½ minutes, by a method of the present invention, when chloride ion is present as an activator in the electrolyte solution to be treated and the anode is of lead, the chromate concentration is reduced to 70 parts per million. Using a still better activator for the mentioned reaction, acetate ion, after less than 2 minutes the same concentration of chromate is reached. Furthermore utilizing the present method and the mentioned activators or their equivalents, after reasonably short periods of time, less than 10 minutes and less than 6 minutes, respectively, the concentration of chromate is reduced to less than one part per million, whereas with the conventional sulfur dioxide treatment more than half an hour is required to approach this figure and then the concentrations are not lowered to the same extent.

The anionic contaminants to be insolubilized by reaction with lead ion may be any of a wide variety and may result from or be present in various liquid media and products, so long as the medium is one in which ionic reactions may occur. Generally the contaminant anion will be present in an aqueous medium and normally it will be completely dissolved or substantially completely dissolved therein. Such an aqueous medium will often be substantially entirely water, most frequently over 90 percent, usually over 95 percent and often over 99 percent of water. However, various non-interfering solvents, solutes and suspended materials may also be present. For example, aqueous alcoholic media may be utilized and dissolved solids such as are present in brackish waters, sea waters, metal finishing treatment rinses, metal plating rinses, cooling tower purge waters, foundry wastes and agricultural run-offs are treatable by the present method, often along with the contaminants to be removed. However, in essentially all the media being treated water comprises a major proportion. The lead-precipitatable anionic contaminant being removed may be any such material which is convertible to insoluble form by electrolytic treatment according to the present process. In other words, if the lead salt of the anion or a lead complex or other compound thereof is less soluble, with respect to the anion, than the concentration of that anion in the medium to be treated, treatment is feasible. Among the anions which are treatable are included chromate, dichromate, cyanide, cyanate, ferrocyanide, borate, arsenate, pyroarsenate, antimonate, selenate, tungstate, phosphite, sulfate, sulfite, persulfate, carbonate and silicate but this list is not exhaustive. Also, the forms of said salts of higher and lower oxidation levels and those found at higher and lower acidities, e.g., perborates, bisulfates, sesquisilicates, etc., may also be treated. Thus, for example, at neutral and slightly alkaline pH's chromate may be precipitatable as lead chromate whereas at lower pH's chromate may be removable as the dichromate. The anionic contaminants are normally present in or were added to the medium being treated as their soluble salts or in acidic forms. Generally, when present as salts the salts will be ammonium or alkali metal salts, e.g., sodium and potassium salts. However the reactions are essentially ionic so the anions are referred to as such and not as salts. Of course, with respect to the contaminants treated and various materials employed, mixtures threof may also be used and sometimes will be found to be preferable.

The anodes will have the active surfaces thereof at least partially of lead or an insoluble (in the aqueous medium) lead donating material which releases lead mainly by action of the electric current, normally in the presence of an activating material. While it is not essential that the lead donating compound should cover the entire surface of the anode, usually it will cover at least 50 percent and preferably over 90 percent thereof. In most preferred cases the entire electrode will be made of such material. As examples of suitable lead donors may be mentioned lead itself and lead alloys, e.g., solders, type metals, pewters and lead-silver alloys. However, mixtures of lead and lead dioxide or other suitable oxides are also useful. In the storage battery and other electrical arts it is known how to make such electrodes and therefore it is unnecessary to describe such methods here. In some cases it may be desirable to employ, at least in part, electrodes of other materials than lead or lead compounds, especially when the impurities being removed are also reacted with such electrode metals. For example, iron, copper and zinc may be present with the lead, generally in comparatively small, usually minor proportions. In such cases the electrolytic actions may include the production of materials which will physically entrap some suspended impurities or adsorb others during the electrolytic operations.

The cathodes are preferably of lead, to facilitate usages as anodes when it is desirable to reverse current flow for cleaning purposes, to increase cell life, etc., but may also be of lead dioxide, iron, steel, carbon or other suitable cathode materials which will be known to those in the art. Because the cathode is relatively inert with respect to removal of the contaminant anions from the aqueous media being treated the nature of the cathode material is not critical but it should be compatible with the anode and the electrolyte and of course, should not interfere with the insolubilization of the anion to be removed.

The "activating" ion for the lead or insoluble lead compound of the anode is one which is capable of forming a lead salt which is soluble in the aqueous medium and from which an insoluble salt, complex or other compound of the anionic contaminant is producible. The activating ion is normally a low molecular weight anion such as acetate, chloride, bromide, nitrate or chlorate or other such ion which will function in the desired manner. Of these, the most preferred, because they are either biodegradable or substantially non-polluting themselves and are comparatively inexpensive, are the acetate and chloride, although lower alkanoic acid salts and halides are also often highly acceptable. Usually the activating anion will be present in or added to the medium being treated as a soluble salt, e.g., ammonium or alkali metal salt, and preferably, will be a part of a buffering system, often either acid-salt or salt-base, which will have the additional effect of maintaining the pH of the electrolyte in the desired range for most efficient production of the insoluble compound of the contaminant anion. When the activator ion does not lend itself to such use, other buffering systems may be employed so as to maintain the pH in the most desired range, which is usually from 2 to 9, especially in the case of the production of lead chromate or dichromate, preferably from 3 to 8. Among useful buffering systems, depending on the contaminant being removed and the purposes requiring removal, may be mentioned sodium acetate—acetic acid; sodium acetate—sodium hydroxide; sodium carbonate — sodium bicarbonate; sodium bicarbonate — carbonic acid (weak); disodium phosphate — trisodium phosphate; boric acid — sodium borate; nitric acid — sodium nitrate; hydrochloric acid — sodium chloride; and pentasodium tripolyphosphate — monosodium phosphate systems. As will be noted, in some cases the buffers may be single salts or mixtures of salts which have been found to regulate pH in the present media.

Because the activating anion solubilizes some lead and maintains it in solution in the electrolyte, when the treated contaminated medium is removed from the cell with insoluble lead salt or other insoluble lead or similar compound therein there is also removed some soluble lead. Because lead (or other metals, if present) is poisonous and an objectionalble pollutant for waters to be discharged or re-used, it should be removed before such discharge or re-use. Such removal may be effected chemically or electrolytically but normally chemical treatment is feasible and is favored. Thus, in the case of lead ion in the effluent from a cell utilized to treat chromate, by addition of phosphoric acid or a suitable salt thereof, e.g., trisodium phosphate, tetrasodium pyrophosphate, monosodium dihydrogen phosphate, essentially all the lead ion may be precipitated from the effluent. The various phosphates, borates, sulfates, carbonates, silicates and other essentially non-poisonous salts may be also utilized to furnish anions to precipitate lead or other insoluble cations from effluents and normally the choice of anion will be such as to promote most effective removal of lead. Of course, an excess of precipitating chemical will not be employed to avoid having it become an objectionable pollutant in the water treated. In this respect, the presence of only a small proportion of lead in the low activator salt concentration in the cell is an advantage because only a small quantity of treating chemical is needed to remove it. However, surprisingly, if the reaction for removal of polluting ion is carried out electrochemically so that final passage of solution is at or near pH's in the range of 6.5 to 7.5, there is essentially no soluble lead in the final solution. The system shows that when all the polluting ions, such as chromate, are reacted, the dissolved lead forms an insoluble complex and/or precipitate, which can be filtered off. The electrolytic cell employed may be of a structure in which the electrodes are located in any suitable configuration and the electrodes may be either monopolar or bipolar. However, vertical stacks of monopolar lead electrodes in which each electrode is monolithic and perforated are preferred. Equivalent forms such as screens, perforated curved sheets, mixtures of screens and perforated sheets, solid sheets, bars and shot may be used to promote the best flows. Also, electrodes of the different materials already mentioned may be utilized and the anodes and cathodes may be the same or different. In some instances, it may be desired to utilize different materials for individual anodes or a plurality of such materials may be employed in one anode.

The spacers between the electrodes will normally be of polymeric plastic material such as the polymerized synthetic organic resins. These include polyvinyl chloride, polyvinylidene chloride, phenol formaldehyde, urea formaldehyde, polystyrene, acrylonitrile-butadiene-styrene, nylon, polyacetal, polypropylene, polyehtylene, polyurethane, polyester, polyether, polysulfones, and other well known plastics, and elastomers, such as butyl rubber, neoprene, EPR, EPDM, natural rubbers, nitrile rubbers, and triazine elastomers. Of course, the plastic or elastomer will be chosen for stability with the aqueous medium being treated. Usually the spacers will be planar and will be from 0.01 to 0.1 inch in thickness, thereby setting such distances between the electrodes. However, in some cases, clearances as great as 0.4 inch can be employed but the size of the cell is thereby usually caused to be increased and in most cases smaller gaps, such as in the 0.01 to 0.05 inch range will be utilized. Generally, the electrodes will be clamped in place, sandwiching the spacers between them, with no need for any special adhesives to be employed to prevent leakage of liquid past the spacers. However, if desired, conventional adhesives, e.g., epoxy resins or plasticized rubbers, may be utilized or greases, e.g., paraffinic greases, may be applied to prevent any leakage.

The assembled electrolytic cell, with electrodes, spacers, conductors, piping and seals in place, is usually sized to fit the particular application contemplated. Such cells may be from 6 inches to 10 feet in height, but will noramlly be from 1 foot to 6 feet. They may have cross-sectional areas from 0.1 square foot to 50 square feet but will normally be in the range of 0.2 to 10 square feet. Throughput flow rates will usuallly be from 0.1 gallon per minute to 10,000 gallons per minute, with a general flow rate being from 2 to 300 gallons per minute. Flow rates and rates of electrolytic removal of contaminant anions are increased by providing a large percentage of active surface for electrolytic reaction at the electrodes and also providing clearances between them to allow flow without great head losses. Normally the original cross-sections of the openings in the electrodes, if the electrodes have such openings, will be from 30 to 90 percent of the total cross-sectional areas of the electrodes, including openings, preferably from 50 to 85 percent thereof. The electrode sections between perforations will usually be of widths less than 1/4 inch, preferably less than 1/8 inch and often, for best reactivity, widths of 1/16 to 3/16 inch will be employed. The electrodes may be supported by the spacers and the spacers may have portions extending under the electrode grids to prevent sagging and short-circuiting. In some preferred embodiments of the invention the electrodes are substantially square or rectangular in cross-section, the container about them is cylindrical or elliptical and the stack arrangement is substantially as described. A wide variety of other shapes and configurations may also be employed.

The method of this invention may be applied to various concentrations of the anionic contaminant in ionizing medium. Generally, the proportion of such contaminant will be less than one percent in the medium; otherwise, chemical or physical methods of separation may be preferable. In most instances the contaminant concentration is from one to 5,000 parts per million and usually this concentration is from 10 to 500 p.p.m. The concentration of activating ion in the aqueous medium, which ion will preferably be selected from the group consisting of acetate, chloride, nitrate, chlorate, and mixtures thereof, is from about five to 200 p.p.m., preferably 15 to 150 p.p.m. Even though current and voltage are identified herein, the most preferred index of this invention is current density, amperes per square foot (ASF). The most preferred current density is between 5 and 10 ASF. The voltage resulting from the cell design is usually from 0.1 to 60 volts, preferably 0.5 to 10 volts and most preferably from 1 to 5 volts. The current flow resulting from the cell design will be from 0.5 to 20,000 amperes, preferably from 2 to 2,000 amperes per cell module. The current density is from 0.005 to 50 amperes per square foot of active anode surface, preferably 0.05 to 30 and most preferably from 5 to 10 ASF. Within the ranges previously given the pH of the electrolyte will usually be maintained so that the solubility of the lead salt of the anionic contaminant is as low as possible, preferably less than one p.p.m. In some instances, however, the process may be useful when the purification is to less than 10 p.p.m. and is to less than half the quantity of contaminant in the aqueous medium before treatment. In other words, care will be taken to maintain a pH which tends to minimize solubilization of the insoluble lead salt of the contaminant anion. Preferred pH's are from 3 to 7.5, most preferably 6.5 to 7.5.

Whether a continuous or batch process is utilized the dwell time of the contaminated medium in the treating cell will usually be held to less than 1 hour and normally is more than 5 seconds. In most instances this dwell time will be from 0.1 to 10 minutes, preferably from 0.5 to 1 minute. In the preferred continuous process activating ion will be continuously added to maintain its concentration at the desirable level. With the activating ion may be added a buffer to maintain the desired pH and in some cases this buffer may be contributing to activation, e.g., sodium acetate — acetic acid buffers. In a preferred form of the invention the activator will contain a mixture of activating ions such as acetate and chloride ions and at least one of such ions, e.g., acetate, will be part of a buffer system.

After production of the insoluble contaminant compound of lead it may be filtered out of the effluent from the cell by conventional filtering means. Also, centrifuging and settling may be employed, if desired. Before or after such filtration any soluble lead or other cations in the effluent may be precipitated by use of a small excess of a precipitating anion, usually added as an ammonium or an alkali metal salt, preferably, the sodium salt. Generally, the excess employed will be less than 100 percent and preferably will be less than 20 percent. In best operations, the excess will be minimal, usually being within the 5 percent range, based on the lead content. When the precipitating chemical is much less harmful or much less polluting than the anion removed by the electrolytic process, larger excesses of such chemical may be employed. As examples of such useful materials may be mentioned the phosphates, pyrophosphates, polyphosphates, silicates, hydroxides, carbonates and mixtures thereof. Reaction times may be from 10 seconds to 1 hour, preferably from 1 to 10 minutes. Temperatures of such reactions will normally be about room temperatures, e.g., 15° to 30° C., but may be within the 10° to 50° C. range, and in some cases, can be higher or lower. Similarly, with respect to the electrolytic reactions, the temperatures will usually be maintained at about ambient but when heated processing streams or feeds are employed or in cases where better separations are obtained, higher temperatures may be used. Thus, such reactions may be effected over the 10° to 50° C. range but are preferably carried out at 15° to 30° C.

In the preferred post-treatments employed to remove lead, as when a soluble phosphate is used, the pH will usually be held within the range of 6.5 to 11 and preferably is from 6.5 to 9.

Although single filtrations can be used to remove both lead-contaminant and lead phosphate (or other scavenger) precipitates, care will be exercised to prevent redissolving of the lead-contaminant, e.g., lead chromate. Thus, it will be preferred to filter separately if the lead chromate and lead phosphate (for examples) are at different pH's. If the pH is held at 6.5 to 7.5 a single filtration is feasible.

The following examples serve to illustrate the invention but do not limit it. All parts are by weight and all temperatures are in ° C. unless otherwise mentioned. The various examples are mostly with respect to removal of low concentrations of chromate from waste waters because this is an imporatant problem solved by the present invention. However, it will be evident that many other anionic impurities are removed by the same or slightly modified methods.

EXAMPLE 1

To an apparatus of the type illustrated in FIGS. 2–4, having a volume of 20 gallons, equipped with perforated lead anodes and cathodes and spacers of polyvinyl chloride, 0.03 inch thick, is fed an aqueous solution containing chromate ion corresponding to 150 parts per million of chromium$^{+6}$ and the flow of such solution is maintained at 5 gallons per minute. The pH of the flowing solution is adjusted by addition of 70 p.p.m. of sodium acetate-acetic acid buffer so that it is 4.5 in the effluent. The d.c. voltage applied is 7 and the current flow is 7 amperes. The current density is maintained in the range of 0.02 to 0.05 ampere per square inch. The reaction is monitored by periodic withdrawals of samples and analyses thereof by standard iodometric technique. The solution being treated is recycled through the cell seven times, after which it is removed and analyzed for total chromium. It is found that the chromate content has been reduced to 0.01 part per million. Subsequently, about 65 p.p.m. of trisodium phosphate are added to the solution and the lead present, produced from the sodium acetate-acetic acid activator-buffer, is reduced to less than 0.1 p.p.m. The phosphate content is less than 10 p.p.m.

When the experiment is repeated, utilizing a rinse obtained in the chromium plating of metals, similarly good results are obtained. Following is the comparison of the initial and final concentrations of constituents of such a rinse.

| | Initial Concentration (p.p.m.) | Final Concentration (p.p.m.) |
|---|---|---|
| Chromium (total) | 205 | 0.02 |
| Cr$^{+6}$ | 200 | 0.02 |
| Copper | 3 | 0.00 |
| Nickel | 0.7 | 0.00 |
| Iron | 0.4 | 0.00 |
| SO$_4^-$ | 120 | — |
| CN$^-$ | 0.8 | 0.01 |
| pH | 3.8 | 4.5 |

In another run, this time using a charge of rinse water effluent from a phosphating metal treatment process, 100 p.p.m. concentration of chromate is reduced to 0.02 p.p.m., under the same conditions.

From the results of the experiments it is apparent that the method is economically sound, costing about 15 to 25 cents per pound of chromate removed. It also appears that the rate of chromate removal may be efficiently effected even at very low concentrations since it depends more on the electrical energy applied and the presence of an activator in the electrolyte than it does on concentrations.

When, instead of utilizing chromate rinses from metal plating solutions, similar rinses from phosphatizing or related metal treatments are employed or when purges from cooling tower waters are treated, corresponding results are obtained. This is also so over the ranges of pH's, currents, voltages, current densities temperatures and concentrations mentioned in the specification, and when the acetate activator is replaced wholly or in part by chloride, although acetate promotes quicker reactions. While the post-treatment with a precipitant, such as a phosphate, improves the purification of the solution charged, without such post-treatment significant decreases in contents of the various ions mentioned are also obtained.

In variations of the experiment, instead of recycling the solution treated, it is cascaded to another similar cell and further improvement in purification is obtained. In such a case, the flow rate is regulated so that the reaction time is 15 minutes in each of the cells.

EXAMPLE 2

In a twenty gallon volume cell like that of Example 1, and also using the apparatus of FIG. 1, 15 gallons of a chromium plating rinse having a hexavalent chromium content of 50 p.p.m. is adjusted to a pH of 5.6 from its original 6.2 pH by addition of sodium acetate-acetic acid buffer. The product becomes of a light yellow color. Over the anodes and cathodes (there are 20 pairs thereof) there is applied a voltage of about 4 volts, corresponding to a current density of 3.5 amperes per square foot over the total 1.7 square foot area of each electrode. This is continued for 25 minutes, during which time the electrolyte is circulated through the cell by the pump. At the completion of the operation the pH has risen to 7.1 and the chromate content is reduced to 0.01 p.p.m. The chromate is filtered off and then 20 p.p.m. of trisodium phosphate are added to precipitate out the lead so that its final content is less than 0.1 p.p.m.

When the same experiment is repeated with the flow rate being adjusted to approximately 1 gallon per minute through the cell, single flow, the chromate content is reduced to less than 0.1 p.p.m. Subsequent treatment with aqueous trisodium phosphate, disodium phosphate, sodium silicate or pentasodium tripolyphosphate reduces the lead content to less than 1 p.p.m. All of the mentioned reactions take place at room temperature, 25° C.

EXAMPLE 3

At a throughput rate of about 1 liter per minute, a cooling tower water purge containing 20 p.p.m. chromate, 96 p.p.m. sulfate, 65 p.p.m. zinc ion, 95 p.p.m. phosphate, 150 p.p.m. chloride, 40 p.p.m. calcium ion and a minor amount of suspended material (about 200 p.p.m.) is subjected to the electrolytic and chemical treatments described in Example 2. The solution has an initial pH of 5.8 and after addition of 20 p.p.m. of acetate buffer has a pH of 5.0. After electrolysis at 6 amperes the solution is clarified and is found to contain 0 p.p.m. chromate and only traces of the original metal ions. The small proportion of lead present is removed by treatment with trisodium phosphate.

EXAMPLE 4

A foundry effluent containing 2 percent of colloidal clay, 20 p.p.m. hexavalent chromium, 10 p.p.m. $CN^-$, 500 p.p.m. $Ca^{++}$, 300 p.p.m. $Fe^{+++}$, 10 p.p.m., phenolic, 5 p.p.m. $Cu^{++}$ and 3 p.p.m. $Ni^{++}$, having a pH of 7.8, is treated by the method described in Example 3. The addition of the acetate lowers the pH to 6.7. Electrolytic treatment is effected without prior filtration. After 5 minutes of treatment, with the solution being treated flowing through the cell, the colloidal suspension is clarified and insoluble lead compounds and apparently coagulated colloidal material are separated out from the aqueous medium. Analysis of the clear effluent shows its contains 0 p.p.m. chromate and greatly diminished quantities of the other ions and the colloidal clay, when they are not removed entirely. Subsequent phosphate treatment (disodium phosphate) removes the lead. Results appear to be the same whether sequential filtrations or a combined filtration is effected.

EXAMPLE 5

The following tables describe the decrease in chromate concentration as the treatment of a rinse from chrome plating is continued. The cell employed is that of Example 1. As is noted, even when the concentration of hexavalent chromium is initially greater, in Table 2, the chromate concentration is reduced to 0 p.p.m. after only 7 minutes, compared to 6 minutes when approximately half the initial chromate concentration is present.

TABLE 1

| Time after start (min.) | pH | Potential (volts) | Current (amps) | Chromate Conc. (p.p.m.) | kw.-hr. |
|---|---|---|---|---|---|
| 0 | 4.8 | 6.0 | 7.0 | 48.7 | 0 |
| 5 | 5.2 | 5.0 | 6.0 | 33.0 | 0.15 |
| 10 | 5.2 | 5.0 | 6.0 | 24.4 | 0.30 |
| 15 | 5.2 | 5.0 | 6.0 | 18.2 | 0.45 |
| 20 | 5.4 | 5.0 | 6.0 | 11.1 | 0.60 |
| 25 | 5.5 | 5.0 | 6.0 | 5.0 | 0.75 |
| 30 | 5.6 | 5.0 | 6.0 | 0 | 0.90 |

TABLE 2

| 0 | 5.2 | 7.0 | 7.0 | 86.0 | 0 |
|---|---|---|---|---|---|
| 5 | 5.5 | 7.0 | 7.0 | 43.8 | 0.25 |
| 10 | 5.7 | 7.0 | 7.0 | 31.0 | 0.49 |
| 15 | 5.9 | 7.0 | 7.0 | 22.5 | 0.74 |
| 20 | 6.1 | 7.0 | 7.0 | 16.0 | .98 |
| 25 | 6.3 | 7.0 | 7.0 | 10.1 | 1.23 |
| 30 | 6.5 | 7.0 | 7.0 | 5.0 | 1.47 |
| 35 | 6.7 | 7.0 | 7.0 | 0.0 | 1.72 |

EXAMPLE 6

In a 1 liter electrolytic cell equipped with one lead dioxide anode and two iron cathodes, each of 3 inches by 3 inches and spaced apart 2 mm. by polyvinyl chloride separators, which cell is oriented like that of FIGS. 2 and 3, and which operates at room temperature, various contaminant-containing aqueous solutions are treated, at 6 volts and 3 amperes. At the end of each reaction the copious solid formed is filtered off and the filtrate is analyzed. Results are summarized in Table 3.

EXAMPLE 7

The following table describes additional experiments

TABLE 3

| Ions removed | Insol. compound | Color | Anode mat. | Cathode mat. | Buffer | pH | Initial conc. (p.p.m.) | Final conc. (after 30 minutes) |
|---|---|---|---|---|---|---|---|---|
| Borate | $Pb(BO_2)$ | W | Pb | Fe | OAc | 6.5 | 60 | 0.1 |
| Antimonate | $Pb_3(SbO_4)_2$ | Or. Y. | Pb | Pb | OAc | 4.5 | 30 | 0.01 |
| Arsenate | $PbHAsO_4$ | Or. Y. | Pb | Fe | OAc | 4.5 | 10 | 0.1 |
| Pyroarsenate | $Pb_2As_2O_7$ | R | PbO | Pb | OAc | 5.2 | 2.0 | 0.1 |
| Phosphate | $Pb_3(PO_4)_2$ | W | Pb | Fe | Cl+OAc | 4.5 | 100 | 0.01 |
| Phosphite | $PbHPO_3$ | W | Pb | Fe | Cl+OAc | 5.6 | 100 | 0.02 |
| Carbonate | $PbCO_3 \cdot Pb(OH)_2$ | W | Pb | Fe | OAc | 7.0 | 100 | 0.1 |
| Cyanides | $Pb(CN)_2$ | W | Pb | $PbO_2$ | Cl | 7.5 | 60 | 0.1 |
| Cyanate | $Pb(CNO)_2$ | W | Pv | Pb | Cl | 7.5 | 30 | 0.1 |
| Ferrocyanide | $Pb_2[Fe(CN)_6]_2$ | Br. | Pb | Fe | OAc | 6.5 | 30 | 0.1 |
| Persulfate | $PbS_2O_8$ | Br. | Pb | Pb | OAc | 6.8 | 40 | 0.1 |
| Selenate | $PbSeO_4$ | W | Pb | Pb | OAc | 7.1 | 45 | 0.1 |
| Silicate | $PbSiO_3$ | W | Pb | Pb | OAc | 7.5 | 80 | 0.3 |
| Sulfite | $PbSO_3$ | W | Pb | Pb | OAc | 6.5 | 60 | 0.2 |
| Tungstate | $PbWO_4$ | Br. | Pb | Pb | OAc | 6.5 | 40 | 0.1 |

NOTE.—Color: W=white; Or. Y.=Orange Yellow; R=Red; Br.=Brown; OAc=acetate (Na or H); Cl=chloride (Na or H).

run utilizing an electrolytic cell of the type shown in FIGS. 2 and 3. As is noted, the chromate concentrations are reduced to less than one part per million from concentrations as great as 200 p.p.m. Such reaction takes place in all cases within 1 hour. Also, the amount of lead remaining after phosphate treatment is less than 0.1 p.p.m.

TABLE 4

| Exp't | Anode Material | Anode Number of plates | Anode Total surface area (sq. in.) | Cathode Material | Cathode Number of plates | Cathode Total surface area (sq. in.) | Electrode spacing (in.) | Total volume (gal.) | Pumping rate (gals./min.) | Reaction time (min.) | Volts | Amperes | Acetate added (p.p.m.) | Initial pH | Initial chromate (p.p.m.) | Phosphate added (p.p.m.) | Final pH | Final chromate (p.p.m.) |
|---|---|---|---|---|---|---|---|---|---|---|---|---|---|---|---|---|---|---|
| A | Pb | 1 | 128 | Pb | 1 | 128 | 0.25 | 2.8 | 0.5 | 10 | .2 | 6 | 80 | 4.6 | 200 | 80 | 4.65 | 0.02 |
| B | Pb | 8 | 198 | PbO₂ | 7 | 173 | 0.03 | 15.0 | 5.0 | 55 | 0.35 | 1.5 | 50 | 4.5 | 62.3 | 10 | 4.15 | 0 |
| C | Pb | 8 | 198 | Fe | 7 | 173 | 0.03 | 9.5 | 0.3 | 16 | 0.17 | 1.5 | 100 | 4.55 | 56.8 | 10 | 4.6 | 0 |
| D | PbO₂ | 8 | 198 | PbO₂ | 7 | 173 | 0.03 | 2.8 | 0.5 | 29 | 0.2 | 1.5 | 100 | 4.6 | 54.8 | 10 | 4.65 | 0.2 |
| E | PbO₂ | 16 | 396 | Fe | 14 | 347 | 0.03 | 2.8 | 0.5 | 78 | 0.08 | 1.5 | 100 | 5.1 | 69.7 | 10 | 5.25 | 0 |
| F | Pb | 36 | 891 | PbO₂ | 30 | 743 | 0.03 | 10 | — | 51 | 1.0 | 6.0 | 20 | 5.2 | 88.5 | 20 | 5.15 | 0.01 |
| G | Pb | 36 | 891 | PbO₂ | 30 | 743 | 0.03 | 10.5 | 3.2 | 35 | 1.5 | 8.0 | 40 | 4.75 | 88.2 | 50 | 4.90 | 0 |
| H | Pb | 36 | 891 | PbO₂ | 30 | 743 | 0.03 | 14.8 | 4.5 | 22 | 1.5 | 9.0 | 100 | 5.2 | 63.8 | 50 | 5.05 | 0 |
| I | Pb | 36 | 891 | PbO₂ | 30 | 743 | 0.03 | 14.8 | 4.5 | 42 | 1.7 | 10.0 | 50 | 5.4 | 55.7 | 50 | 5.4 | 0 |
| J | Pb | 36 | 891 | PbO₂ | 30 | 743 | 0.03 | 14.8 | 4.5 | 25 | 4.0 | 10.0 | 60 | 5.7 | 15.7 | 50 | 6.25 | 5.0 |
| K | Pb | 15 | 891 | Pb | 15 | 743 | 0.03 | 14.8 | 4.5 | 3 | — | 40.0 | 50 | 6.5 | 60.0 | 0 | 7.4 | 0 |

EXAMPLE 8

To an electrolytic cell like that of Example 1, of 20 gallon volume and containing 15 gallons of 63.3 p.p.m. hexavalent chromium (chromate and dichromate), are added 9 grams of concentrated nitric acid and the electrolytic reation is carried out as described in Example 1, with the exception that the nitric acid is employed as a source of activating nitrate ion, rather than the acetate ion being used for this purpose. The final hexavalent chromium content is 0.01 p.p.m. and the operating current efficiency is 90 percent. Conditions of the experiment follow:

Anode—Lead (126.6 sq. in.)
Cathode—Lead (126.6 sq. in.)
Electrode spacing—0.03 inch
Total reaction time—15 minutes
Potential applied—5.8 volts
Current—6.0 amperes
Initial pH—3.2
Final pH—4.8

This invention has been described with respect to illustrations and examples thereof but is not to be limited to them because it will be obvious to one of ordinary skill in the art, with the present specification before him, that equivalents and substitutes may be utilized without departing from the scope of the inveniton.

What is claimed is:

1. A method for the removal of a lead-precipitatable anionic contaminant from an ionizing medium in which it is present at a low concentration which comprises passing an electric current between an anode having on a surface thereof lead, lead alloy or an insoluble lead compound, and a cathode, through the ionizing medium containing the anionic contaminant and an activating ion for the lead, lead alloy or insoluble lead compound of the anode, which activating ion is capable of forming from the anode material a lead salt which is soluble in the ionizing medium, to produce an insoluble lead salt or complex of the anionic contaminant, and removing the insoluble lead salt or complex from the ionizing medium.

2. A method according to claim 1 wherein the lead-precipitatable anionic contaminant is selected from the group consisting of chromate, dichromate, cyanide, cyanate, ferrocyanide, borate, arsenate, pyroarsenate, antimonate, selenate, tungstate, phosphite, sulfate, sulfite, persulfate, carbonate, and silicate, the ionizing medium is an aqueous one, the anionic contaminant is at a concentration of 1 to 5,000 parts per million before production of insoluble lead salt, the electric current is direct or essentially direct, the current density is from 0.005 to 50 ASF, the electrolyte communicates freely with the anode and cathode, without interposition of a diaphragm, the anode surface is of lead or lead dioxide, the activating ion is selected from the group consisting of acetate, chloride, nitrate, chlorate and mixtures thereof and is present in the electrolyte at a concentration of 5 to 200 parts per million and the pH of the electrolyte is in a range in which the solubility of the lead salt of the anionic contaminant is less than 10 parts per million in the aqueous medium and is sufficiently low so that the anionic contaminant in the soluble portion of the lead contaminant salt produced is less than half the quantity thereof in the aqueous medium before production of said insoluble lead salt.

3. A method according to claim 2 wherein the aqueous medium containing anionic contaminant is continuously passed through an electrolytic cell, activating ion is continuously added to maintain the desired concentration thereof, the dwell time of the contaminated aqueous medium in the treating cell is from 0.1 minute to 1 hour, after completion of treatment the treated medium is continuously removed from the cell, together with insoluble lead salt of the anionic contaminant and any soluble lead salt of the activating ion produced and after removal the soluble lead salt of the activating ion is reacted with an anion capable of producing an insoluble lead salt, to produce such salt, and the insoluble salts are removed from the aqueous medium.

4. A method according to claim 3 wherein the aqueous medium containing anionic contaminant is continually pumped through an electrolytic cell, the electrodes of which are covered by the medium, after which the insoluble lead salt of the anionic contaminant is removed from the aqueous medium by filtration, with the rate of flow of the aqueous medium and the conditions in the electrolytic cell being controlled so as to remove at least 90 percent of the anionic contaminant from the aqueous medium charged to the electrolytic cell.

5. A method according to claim 4 wherein after removal of the aqueous medium from the electrolytic cell it is treated with a soluble phosphate at a pH of 6.5 to 7.5 to precipitate out any soluble lead ions present as an insoluble lead phosphate and the insoluble lead salt of the contaminant and insoluble lead phosphate are filtered out together.

6. A method according to claim 4 wherein the electrolytic treatment and filtering removal of anionic contaminant are repeated, with the aqueous medium being returned to a storage tank after filtration and recirculated from said tank through the electrolytic cell until the concentration of the anionic contaminant in the storage tank is sufficiently reduced to permit re-use or sewering and the aqueous medium is discharged from the tank for such re-use or sewering.

7. A method according to claim 4 wherein the aqueous medium containing anionic contaminant is water containing chromate or dichromate ion to be removed therefrom, the concentration of activating ion is 15 to 150 parts thereof per million, the concentration of chromate ion in the medium charged to the cell is from 10 to 500 parts per million, the pH of the aqueous medium in the cell is in the range of 2 to 9, preferably 3 to 4, and the medium is treated, after chromate precipitation, with a soluble phosphate at a pH of 3 to 11, preferably 6.5 to 9.

8. A method according to claim 7 wherein the aqueous chromate solution being treated is selected from the group consisting of chromate-containing purge stream from cooling tower water in which chromate ion is present as a corrosion inhibitor, microbicide and slimicide, a chrome plating rinse solution and a chrome phosphatizing solution, and the chrome is recovered as lead chromate.

9. A method according to claim 1 wherein the anionic contaminant is chromate or dichromate and the ionizing medium is water, the low concentration of chromate is from 10 to 500 parts per million, as chromate ion, the anode has on the surface thereof lead, lead alloy or lead dioxide and the cathode has on the surface thereof a material selected from the group consisting of lead, lead dioxide, iron, steel, lead alloys and iron alloys.

10. A method according to claim 9 wherein the electric current is essentially direct and of a current density from 0.005 to 50 ASF, the electrolyte communicates freely with the anode and cathode, without interposition of a diaphragm, the activating ion is selected from the group consisting of acetate, chloride and nitrate and is present in the electrolyte at a concentration of 5 to 200 parts per million, and the pH of the aqueous medium containing chromate contaminant and activating ion is in the range of 2 to 9.

11. A method according to claim 10 wherein the chromate solution from which chromate contaminant is being removed is continuously passed through an electrolytic cell, the activating ion is continuously added to maintain it at a concentration of 15 to 150 parts per million, the dwell time of the chromate solution in the treating cell is from 1 minute to 1 hour and its pH is from 3 to 6.5, after completion of the electrolytic treatment and precipitation of insoluble lead chromate or lead dichromate therein the treated medium is continuously removed from the cell, together with insoluble lead chromate or lead dichromate and any soluble lead acetate, lead chloride or lead nitrate, and after removal the soluble lead salt is reacted with phosphate ion to produce insoluble lead phosphate, following which the insoluble lead chromate or lead dichromate and lead phosphate are separated from the aqueous medium.

12. A method according to claim 11 wherein the aqueous chromate solution being treated is a purge stream from chromate-containing cooling tower water.

13. A method according to claim 11 wherein the aqueous chromate solution being treated is rinse water from a chrome plating process or a phosphatizing process.

14. A method according to claim 4 wherein the pH control of the electrolyte is effected by means of a chemical buffering system.

15. A method according to claim 14 wherein the chemical buffering system is a sodium acetate-acetic acid buffer, the activator includes acetate and chloride ions and the anion reacted with the soluble lead salt is phosphate, charged as trisodium phosphate.

16. A method according to claim 11 wherein banks of cells are operated in cascade so that any chromate in the effluent from a treatment cell is further lowered in concentration by production of insoluble lead chromate in a subsequent treatment cell.

17. A method according to claim 2 wherein the aqueous medium containing anionic contaminant is continuously passed through an electrolytic cell, activating ion is continuously added to maintain the desired concentration thereof, the dwell time of the contaminated aqueous medium in the treating cell is from 0.1 to 1 hour, after completion of treatment the treated medium is continuously removed from the cell, together with insoluble lead salt of the anionic contaminant, and the pH of the effluent from the cell is regulated to be in the range of 6.5 to 7.5, at which pH essentially no soluble lead salt is present, and the insoluble contaminant salt is removed from the aqueous medium.

* * * * *